3,008,908
PLASTICS MOLDING PROCESS AND THE RESULTING PRODUCTS

Jan Lodewijk Voigt, Arnhem, Netherlands, assignor to N.V. Onderzoekings-Instituut Research, Arnhem, Netherlands, a corporation of the Netherlands
No Drawing. Filed Sept. 23, 1957, Ser. No. 685,429
Claims priority, application Netherlands Sept. 24, 1956
4 Claims. (Cl. 260—18)

This invention relates to a new and improved process for the preparation of plastics molding materials, and to the resulting molded products. More particularly, the invention relates to such processes and products when working with plastics consisting essentially of high molecular weight synthetic linear polyamides, and especially those polyamides prepared from ε-caprolactam or ε-aminocaproic acid.

It has been found that when casting and injecting molding polyamides, difficulties arise on withdrawing the molded objects due to the adhesion of said objects to the mold, and therefore lubricants are used to prevent said adhesion. Also on extruding polyamides in plasticized condition a lubricant is used to facilitate the extrusion. The lubricants used in these cases are usually oil-like substances, although substances such as zinc stearate have also been used for this purpose. However, in practice such substances in admixture with polyamides are not satisfactory. Particularly when working with polyamides prepared by means of polycondensation of ε-caprolactam or ε-aminocaproic acid, difficulties have arisen with the lubricants known up till now, because in this case strong adhesion to the material of the mold always occurs.

According to the present invention it has been discovered that the foregoing difficulties during the casting, injection molding or extruding of polyamides prepared by the polycondensation of ε-caprolactam or ε-aminocaproic acid may be entirely prevented if these polyamides are mixed with at least one compound selected from the class consisting of wool fat and compounds having the formula $C_nH_{2n+1}OR$, wherein $n$ represents an integer from 12 to 36 and R is selected from the class consisting of hydrogen and the radical $C_mH_{2m+1}C=O$, in which $m$ represents an integer from 12 to 34.

If, for instance, dodecanol is used as a lubricant considerably less adhesion of the molded objects to the mold occurs.

The degree of adhesion of the molded objects to the mold here is determined as follows.

Grains of polyamide prepared by the polycondensation of ε-caprolactam are mixed with a given lubricant, after which with the aid of an automatically operating injection molding machine 150 combs are molded from the grains. As soon as a comb gets stuck in and adheres to the mold, a note is made of the number of combs which up till then have left the mold without adhering. Next, the machine is put into operation again until the next comb adheres to the mold. The number of combs discharged before that without adhering is again noted down. This is repeated until 150 combs have been molded. In this manner the average number of combs that in succession have left the mold without adhering is determined with each sample of grains.

In the following table the results are given of experiments made with different alcohols serving as a lubricant. From said table it appears that as the number of C-atoms in the alcohol increases the combs are withdrawn more easily.

| Lubricant | Percent by weight calculated on polyamide | Average number of combs successively having left the mold without adhering |
|---|---|---|
| None | | 1 |
| Octanol | 0.5 | 2 |
| Dodecanol | 0.5 | 5 |
| Tetradecanol | 0.5 | 41 |
| Octadecanol | 0.5 | 106 |

According to a preferred embodiment of the process according to the present invention, octadecanol is used as a lubricant.

Also fatty acid esters of octadecanol and other higher alcohols have a favorable influence on the ease of discharging of the molded objects from the mold.

According to another preferred embodiment of the process according to the present invention, palmitic acid ester of hexadecanol is used as a lubricant.

According to another preferred embodiment of the process according to the present invention, the stearic acid ester of octadecanol is used as a lubricant.

Furthermore, mixtures of aliphatic mono-alcohols having from 12 to 36 C-atoms with esters of said alcohols with aliphatic monovalent acids having from 13 to 35 C-atoms have a favorable influence on discharging the molded objects from the mold.

According to still another preferred embodiment of the process according to the present invention, carnauba wax is used as a lubricant.

According to another very much preferred embodiment of the process according to the present invention, wool fat is used as a lubricant.

It has been found that at least 0.005% by weight, calculated on the polyamide, of the lubricant is required in order to attain the desired result and preferably between 0.02 and 1.5% by weight is used in intimate admixture with the polyamide.

The addition of lubricants according to the present invention may be effected in different ways. Thus, for instance, the lubricants may be mixed with the grains of polyamides before casting, injection molding or extruding, or they may be mixed with molten polyamides.

It should be noted that the addition of lubricants according to the present invention has no noticeable influence on the properties of the polyamide.

The manner in which the foregoing features of the invention are attained will appear more fully from the following examples, in which reference is made to typical and preferred procedures in order to indicate more fully the nature of the invention, but without intending to limit the invention thereby.

Example I

Grains of polyamide obtained by the polycondensation of ε-caprolactam were molded to combs with the aid of a conventional automatically operating injection molding machine.

The average number of combs that in succession left the mold without adhering thereto was 1.

The same grains were mixed with 0.1% by weight of tetradecanol and molded to combs with the same injection molding machine, in which case the average number of combs that was automatically discharged without adhering was 5.

The same grains, mixed with 0.2% by weight and 0.5% by weight of tetradecanol, resulted in an average number of combs that did not adhere to the mold of 9 and 41, respectively.

*Example II*

Grains of polyamide were mixed with 0.1% by weight of the palmitic acid ester of hexadecanol and molded to combs in the manner indicated in Example I. The average number of combs that left the mold without adhering was 150.

*Example III*

Grains of polyamide according to Example I were mixed with 0.05, 0.1 and 0.5% by weight of carnauba wax, after which the grains were molded to combs with the same injection molding machine as in Example I. The average number of combs that left the mold without adhering was 140, 150 and 150, respectively.

*Example IV*

Grains of polyamide according to Example I were mixed with 0.05, 0.1 and 0.5% by weight of wool fat, after which the grains were molded to combs with the same injection molding machine as in Example I. The average number of combs that left the mold without adhering was 150 in all these cases.

*Example V*

To a device for the continuous preparation of highly polymeric compounds, as described in British patent specification 705,029, 10 kg. of ε-caprolactam mixed with 0.1% by weight of phosphoric acid and 5% by weight of water as a catalyst and 0.2% by weight of wool fat as a lubricant was supplied per unit of time (hour). The supply and also the discharge were set in such a manner that the reaction mass remained in the helically shaped canal for at least 24 hours at about 260° C. and remained in the tempering container for about 6 hours at about 240° C. 10 kg. per hour of polyamide with an intrinsic viscosity of 1.3 were withdrawn from said container in the form of a thread having a diameter of about 2 mm. The freshly extruded thread was passed through water and chopped into grains, after which said grains were washed with water and then dried.

The grains were molded to combs with the aid of the same injection molding machine as in Example I. None of the 150 molded combs adhered to the mold.

While specific examples of preferred methods embodying the present invention have been set forth above, it will be understood that many changes and modifications may be made therein without departing from the spirit of the invention. It will therefore be understood that the examples cited and the particular proportions and methods of operation set forth above are intended to be illustrative only, and are not intended to limit the scope of the invention.

What is claimed is:

1. A process for the preparation of molding material comprising admixing a polymer prepared by the polycondensation of a monomer selected from the class consisting of ε-caprolactam and ε-aminocaproic acid with the palmitic acid ester of hexadecanol as a lubricant.

2. A process according to claim 1, in which the lubricant is employed to the extent of at least 0.005% by weight, calculated on the polymer.

3. A process according to claim 1, in which the lubricant is employed to the extent of between 0.02 and 1.5% by weight, calculated on the polymer.

4. Molded objects obtained from the material prepared according to the process described in claim 1.

References Cited in the file of this patent

UNITED STATES PATENTS

| | | |
|---|---|---|
| 2,309,729 | Gordon | Feb. 2, 1943 |
| 2,604,664 | Jordan | July 29, 1952 |

OTHER REFERENCES

"Chemistry of Synthetic Resins," by Ellis, pub. 1935, vol. 2, pp. 1326–27.

Simonds et al.: "Handbook of Plastics," 2nd ed., pub. 1943, by Van Nostrand Co., pp. 315–16.

Worth: "The Chemistry and Technology of Waxes," 2nd ed., pub. by Reinhold Pub. Co. 1956, pp. 127–28.